(12) United States Patent
Furukawa et al.

(10) Patent No.: US 8,378,540 B2
(45) Date of Patent: Feb. 19, 2013

(54) MOTOR AND MOTOR MANUFACTURING METHOD

(75) Inventors: Keizo Furukawa, Kyoto (JP); Nobuyuki Iwashita, Kyoto (JP); Masato Yamamoto, Kyoto (JP)

(73) Assignee: Nidec Corporation, Kyoto (JP)

( * ) Notice: Subject to any disclaimer, the term of this patent is extended or adjusted under 35 U.S.C. 154(b) by 198 days.

(21) Appl. No.: 13/004,046

(22) Filed: Jan. 11, 2011

(65) Prior Publication Data

US 2011/0169358 A1 Jul. 14, 2011

(30) Foreign Application Priority Data

Jan. 12, 2010 (JP) .................................. 2010-003568
Nov. 24, 2010 (JP) .................................. 2010-261250

(51) Int. Cl.
*H02K 5/00* (2006.01)

(52) U.S. Cl. .............................. 310/89; 310/90; 310/194

(58) Field of Classification Search ............ 310/89–90, 310/71, 68 B, 194, 67 R
See application file for complete search history.

(56) References Cited

U.S. PATENT DOCUMENTS

| | | | | |
|---|---|---|---|---|
| 5,877,574 | A * | 3/1999 | Molnar | 310/215 |
| 6,005,312 | A * | 12/1999 | Yamane | 310/67 R |
| 6,933,649 | B2 * | 8/2005 | Fujii et al. | 310/216.045 |
| 6,954,017 | B2 * | 10/2005 | Takahashi et al. | 310/85 |
| 7,291,955 | B2 * | 11/2007 | Otsuji | 310/194 |
| 7,294,944 | B2 | 11/2007 | Fujii | |
| 7,420,304 | B2 * | 9/2008 | Sugiyama et al. | 310/90 |
| 7,466,050 | B2 * | 12/2008 | Kuyama et al. | 310/90 |
| 7,508,102 | B2 * | 3/2009 | Sugiyama et al. | 310/67 R |
| 7,876,008 | B2 * | 1/2011 | Yoshida et al. | 310/71 |
| 8,089,184 | B2 * | 1/2012 | Yoshida et al. | 310/71 |
| 2008/0024019 | A1 | 1/2008 | Sakuma et al. | |
| 2008/0054735 | A1 | 3/2008 | Yoshida et al. | |

FOREIGN PATENT DOCUMENTS

| | | |
|---|---|---|
| CN | 101114779 A | 1/2008 |
| CN | 101136563 A | 3/2008 |
| JP | 2006-109575 A | 4/2006 |
| JP | 2008-054390 A | 3/2008 |

* cited by examiner

*Primary Examiner* — Thanh Lam
(74) *Attorney, Agent, or Firm* — Keating & Bennett, LLP

(57) ABSTRACT

A motor includes a stator, a bearing, a cover, a shaft, a rotor holder and a rotor magnet. The cover member includes an outer cylinder portion arranged to support the stator on the inner surface thereof, an inner cylinder portion arranged to support the bearing on the inner surface thereof and a bottom portion arranged to interconnect the lower end of the outer cylinder portion and the lower end of the inner cylinder portion. The stator includes a stator core, an insulator arranged to cover the stator core and coils. The cover member is preferably formed by press-forming a single metal plate member. The insulator includes a protrusion portion positioned radially outwards of the coils to protrude upwards higher than the upper end of the outer cylinder portion. The upper ends of the coils are positioned higher than the upper end of the outer cylinder portion.

23 Claims, 12 Drawing Sheets

MOTOR AND MOTOR MANUFACTURING METHOD

BACKGROUND OF THE INVENTION

1. Field of the Invention

The present invention relates to an inner rotor type motor.

2. Description of the Related Art

An inner rotor type motor has conventionally been used in many different applications. For example, the inner rotor type motor is used as a drive power source in office machines such as copy machines and combined machines. One example of such an inner rotor type motor includes a housing and a cover. Another example of an inner rotor type motor includes a sensor substrate which is attached to an electric insulation member of a stator and a magnetic sensor arranged to detect the magnetic pole position of a rotor is attached to the sensor substrate.

However, in the inner rotor type motor including the housing and the cover, a large number of work steps are necessary to confirm and adjust the positions of the housing and the cover in order to assure higher concentricity of the housing and the cover. In case where a single member press-formed to have a housing and a cover is used in place of the housing and the cover, there is a need to perform a complex deep drawing work. As a result, it is necessary to use expensive molds and to perform numerous work steps, which in turn increases the manufacturing cost.

In the inner rotor type motor including a sensor substrate provided with a magnetic sensor, the sensor substrate is fixed to an insulator attached to a stator core. The stator core has a laminated steel plate structure in which steel plates are laminated one above another. The lamination of the steel plates results in an accumulation of non-uniformity resulting from the manufacturing tolerances of the respective steel plates. As a consequence of this non-uniformity, the magnetic sensor must be greatly spaced apart from a rotor magnet in the axial direction to ensure that the laminated steel plate structure cannot come into contact with the rotor magnet. This may possibly reduce the detection accuracy of the rotational position of the rotor magnet.

Moreover, it is sometimes the case that the sensor substrate is deformed under the influence of pressure or heat applied thereto during the process of mounting electronic components. In this case, the magnetic sensor is spaced apart from the rotor magnet, which may possibly reduce the detection accuracy of the rotational position of the rotor magnet.

SUMMARY OF THE INVENTION

In accordance with a first preferred embodiment of the present invention, there is provided a motor including: an annular stator concentric with a vertically extending center axis; a bearing; a cover member arranged to hold the stator and the bearing in position; a shaft arranged to be supported by the bearing to rotate about the center axis; a rotor holder connected to the shaft; and a rotor magnet attached to the rotor holder and arranged inside the stator. The cover member preferably includes an outer cylinder portion arranged to support the stator on the inner surface thereof, an inner cylinder portion coaxial or substantially coaxial with the outer cylinder portion and arranged to support the bearing on the inner surface thereof and a bottom portion arranged to interconnect the lower end of the outer cylinder portion and the lower end of the inner cylinder portion. The stator preferably includes a stator core with a plurality of teeth, an insulator arranged to cover the stator core and coils defined by winding conductive wires over the insulator and around the teeth of the stator core, the cover member is preferably a member formed by, for example, press-forming a single metal plate member. The insulator includes a protrusion portion positioned radially outwards of the coils to protrude upwards higher than the upper end of the outer cylinder portion. The upper ends of the coils are positioned higher than the upper end of the outer cylinder portion.

In accordance with a second preferred embodiment of the present invention, there is provided a motor including: an annular stator concentric with a vertically extending center axis; a bearing; a cover member arranged to hold the stator and the bearing in position; a shaft arranged to be supported by the bearing to rotate about the center axis; a rotor holder connected to the shaft; a rotor magnet attached to the rotor holder and arranged inside the stator; a magnetic sensor arranged to detect the rotational position of the rotor magnet; and a circuit board arranged to support the magnetic sensor at the upper side of the rotor magnet. The cover member preferably includes an outer cylinder portion arranged to support the stator on the inner surface thereof, an inner cylinder portion coaxial or substantially coaxial with the outer cylinder portion and arranged to support the bearing on the inner surface thereof and a bottom portion arranged to interconnect the lower end of the outer cylinder portion and the lower end of the inner cylinder portion, the stator preferably including a stator core with a plurality of teeth, an insulator arranged to cover the stator core and coils defined by winding conductive wires over the insulator and around the teeth of the stator core. The insulator includes a protrusion portion positioned radially outwards of the coils to protrude upwards higher than the upper end of the outer cylinder portion. The circuit board is fixed to the insulator. The insulator makes contact with the cover member in an axial direction.

In accordance with a third preferred embodiment of the present invention, there is provided a motor including: an annular stator concentric with a vertically extending center axis; a bearing; a cover member arranged to hold the stator and the bearing in position; a shaft arranged to be supported by the bearing to rotate about the center axis; a rotor holder connected to the shaft; a rotor magnet attached to the rotor holder and arranged inside the stator; a magnetic sensor arranged to detect the rotational position of the rotor magnet; a circuit board arranged to support the magnetic sensor at the upper side of the rotor magnet; and a substantially cylindrical closed-top cap member arranged to cover the upper area of the stator. The cover member preferably includes an outer cylinder portion arranged to support the stator on the inner surface thereof, an inner cylinder portion coaxial or substantially coaxial with the outer cylinder portion and arranged to support the bearing on the inner surface thereof and a bottom portion arranged to interconnect the lower end of the outer cylinder portion and the lower end of the inner cylinder portion, the stator including a stator core with a plurality of teeth, an insulator arranged to cover the stator core and coils are members defined by winding conductive wires over the insulator and around the teeth of the stator core. The insulator includes a protrusion portion positioned radially outwards of the coils to protrude upwards higher than the upper end of the outer cylinder portion. The circuit board is arranged to be gripped between the cap member and the upper end surface of the protrusion portion.

The above and other elements, features, steps, characteristics and advantages of the present invention will become more

DETAILED DESCRIPTION OF THE PREFERRED EMBODIMENTS

Figure 1:
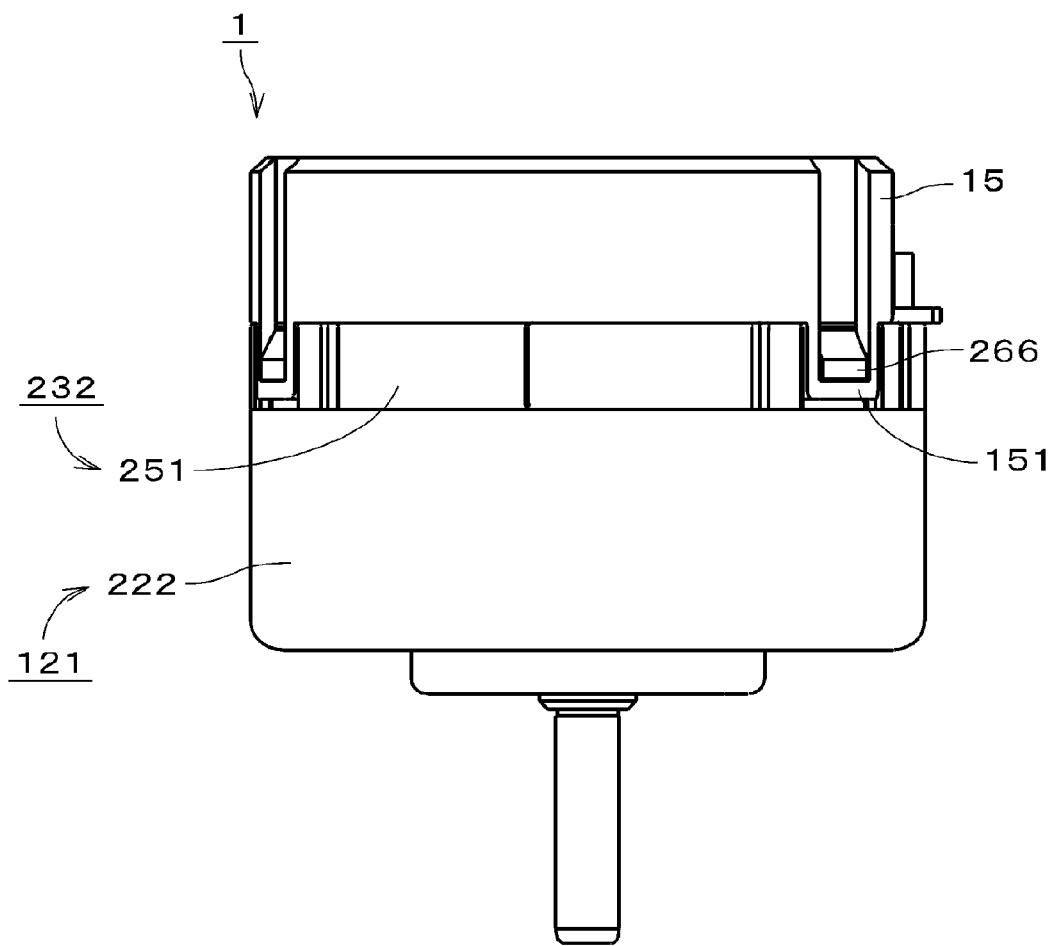
FIG. 1 is a schematic front view showing a motor according to a first preferred embodiment of the present invention.

In the description herein, the upper side along the center axis in the drawings will be just referred to as "upper" and the lower side as "lower". The definitions "upper" and "lower" do not necessarily coincide with the gravitational direction. Moreover, the direction running radially toward or away from the center axis will be just referred to as "radial", and the direction running circumferentially around the center axis will be just referred to as "circumferential".

Figure 2:
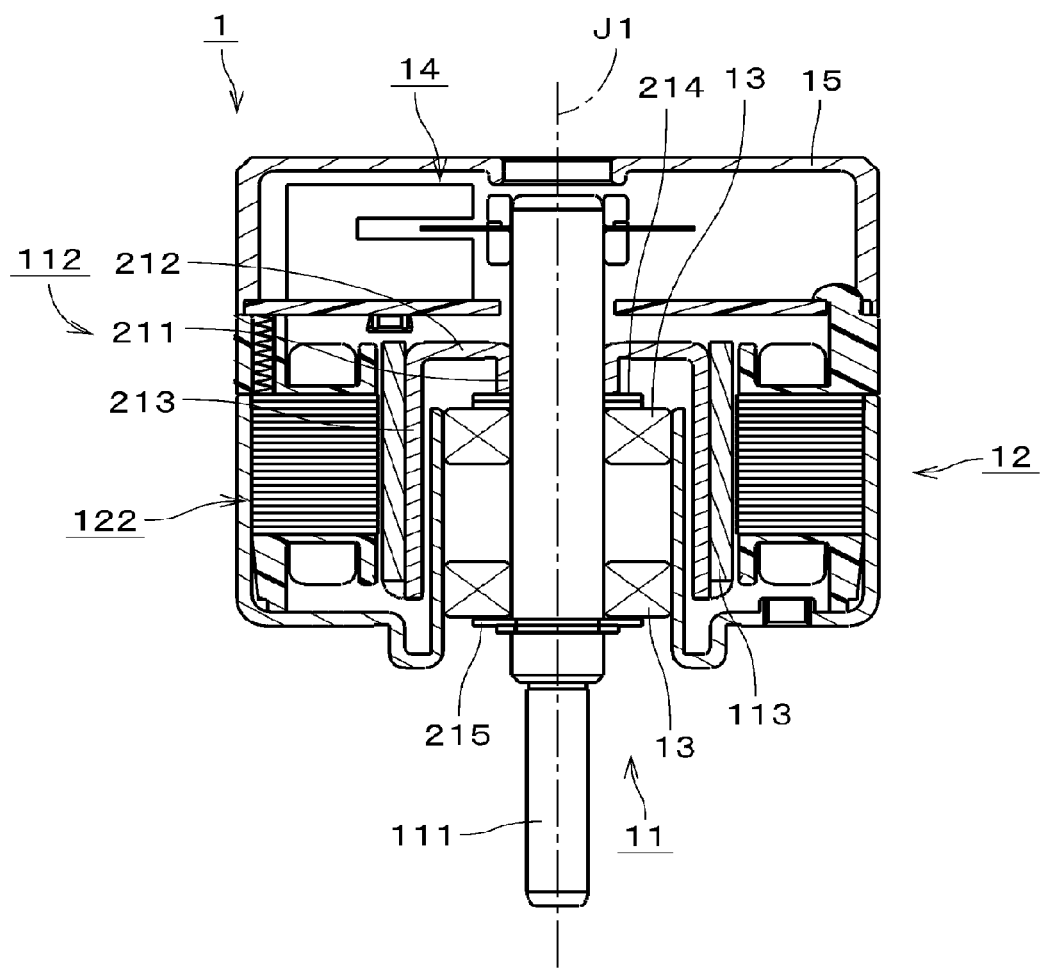
FIG. 2 is a schematic vertical section view of the motor shown in FIG. 1.
Figure 3:
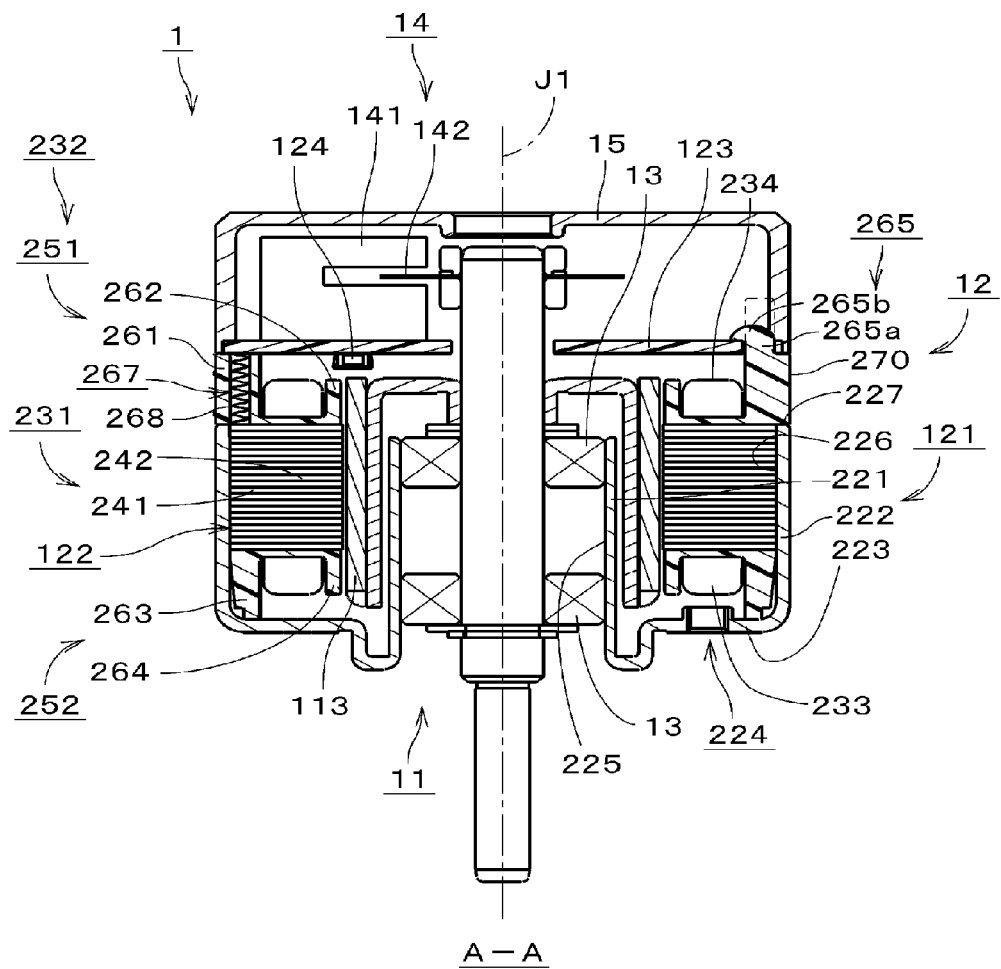
FIG. 3 is another schematic vertical section view of the motor shown in FIG. 1.

FIG. 1 is a schematic front view showing a motor 1 according to the first preferred embodiment of the present invention. FIGS. 2 and 3 are schematic vertical section views of the motor 1 shown in FIG. 1. The motor 1 is an inner rotor type motor used as, for example, a drive power source in office machines such as a copier, a printer and a combined machine, etc. The motor 1 may also be used in any other desired applications such as any applications other than the drive power source of office machines.

As shown in FIG. 2, the motor 1 preferably includes a rotary unit 11, a stationary unit 12, two bearings 13, an encoder 14 and a cap member 15. The rotary unit 11 preferably rotates about a center axis J1 extending in the vertical direction. In FIG. 2, the rotary unit 11 is preferably positioned below the stationary unit 12 with an output shaft facing downwards.

The bearings 13 are fixed to the stationary unit 12 to rotatably support the rotary unit 11. In the present preferred embodiment, oil-impregnated sleeves are preferably used as the bearings 13. However, any other desirable types of bearings could be used. The cap member 15 preferably includes a substantially cylindrical closed-top shape. The cap member 15 is preferably arranged to cover the upper portion of a stator 122. The encoder 14 is preferably positioned within the cap member 15.

The rotary unit 11 preferably includes a shaft 111, a rotor holder 112 and a rotor magnet 113. The shaft 111 preferably includes a substantially cylindrical columnar shape about the center axis J1. The shaft 111 is preferably rotatably supported by the bearings 13. The rotor holder 112 is preferably attached to the shaft 111 at a side opposite from an output side of the shaft 111. In FIG. 2, the rotor holder 112 is preferably positioned at the upper side such that the lower side of the shaft 111 becomes the output side. The rotor holder 112 preferably includes a shaft-fixed portion 211, a connection portion 212 and a cylinder portion 213. The shaft-fixed portion 211 is preferably fixed to the shaft 111 at the upper side of the upper one of the bearings 13. The connection portion 212 preferably extends radially outwards from the shaft-fixed portion 211. The cylinder portion 213 preferably extends downwards from the outer circumference of the connection portion 212. The rotor magnet 113 is preferably fixed to the outer surface of the cylinder portion 213. The rotor magnet 113 may preferably include a substantially cylindrical shape. The rotor magnet 113 may include a plurality of magnet segments arranged in the circumferential direction about the center axis J1. The rotor holder 112 preferably includes a thin plate which is preferably press-formed, for example. The thin plate is made of, e.g., a magnetic metal body, or the like.

A plurality of resin plates 214 is preferably arranged between the shaft-fixed portion 211 and the upper one of the bearings 13. In the present preferred embodiment, two resin plates 214 are preferably arranged between the shaft-fixed portion 211 and the upper one of the bearings 13. However, any other number of resin plates could be used. A stopper 215 is preferably attached to the shaft 111 at the lower side of the lower one of the bearings 13. Accordingly, any vertical movement of the shaft 111 is prevented by the shaft-fixed portion 211 and the stopper 215.

As shown in FIG. 3, the stationary unit 12 preferably includes a cover member 121, a stator 122 and a circuit board 123. The cover member 121 preferably includes an inner cylinder portion 221, an outer cylinder portion 222 and a bottom portion 223. The inner cylinder portion 221 and the outer cylinder portion 222 preferably include a substantially cylindrical shape about the center axis J1. The inner cylinder portion 221 and the outer cylinder portion 222 are preferably coaxial or substantially coaxial with respect to each other. The bottom portion 223 preferably connects the lower end of the outer cylinder portion 222 and the lower end of the inner cylinder portion 221. A plurality of attachment holes 224 is defined in the bottom portion 223. The attachment holes 224 are preferably used in attaching the motor 1 in a desired position. The inner cylinder portion 221 preferably includes an inner surface 225 arranged to support the bearings 13. The outer cylinder portion 222 preferably includes an inner surface 226 arranged to support the stator 122. As will be described below, the cover member 121 preferably includes a single plate member which is, for example, press-formed. The plate member preferably includes a metallic material, for example. Preferably, the cover member 121 is an electrically conductive member. More preferably, the cover member 121 is a magnetic body.

The stator 122 preferably includes a stator core 231, an insulator 232 and a plurality of coils 233. The stator 122 preferably includes a substantially ring shape arranged about the center axis J1. The stator core 231 preferably includes a plurality of thin steel plates laminated one above another. The stator core 231 preferably includes an annular core-back 241 and a plurality of teeth 242. The core-back 241 is preferably press-fitted to the outer cylinder portion 222. The teeth 242 preferably extend radially inwards from the core-back 241. The tip ends of the teeth 242 are preferably radially opposed to the rotor magnet 113. The insulator 232 preferably includes a resin material, for example. The insulator 232 is arranged to cover the stator core 231.

Figure 4:
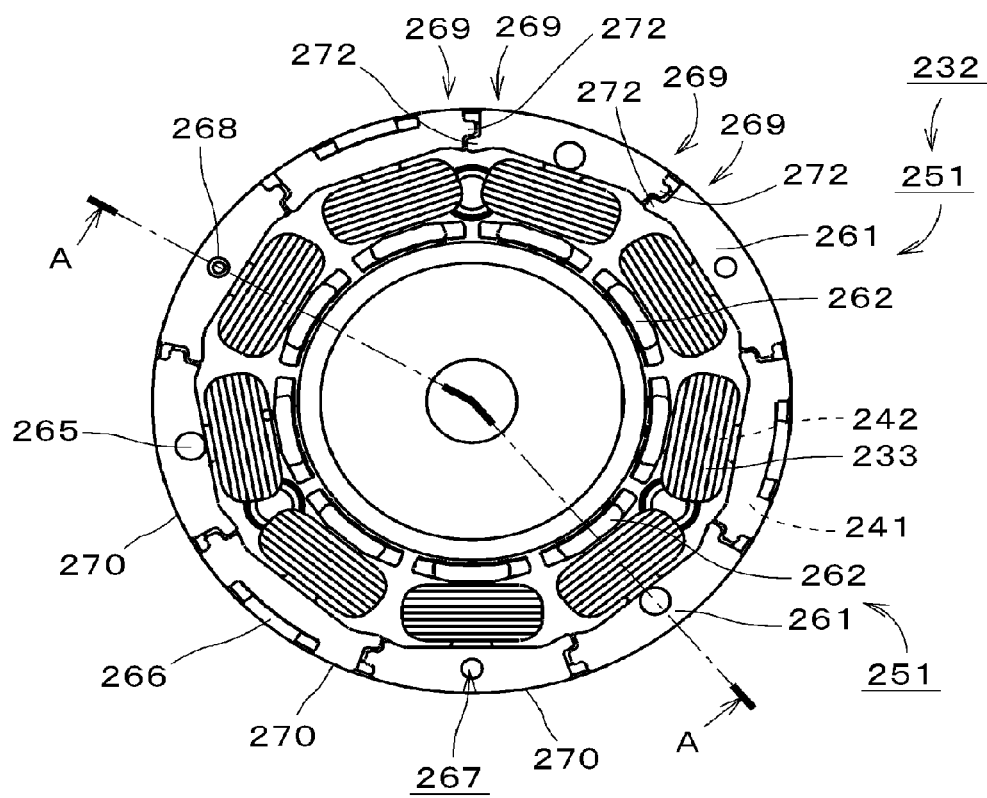
FIG. 4 is a schematic plan view of the motor to which a circuit board is not yet attached.

The circuit board 123 is preferably positioned above the insulator 232 and fixed to the top surface of the insulator 232. FIG. 4 is a schematic plan view of the motor 1 to which the circuit board 123 is not yet attached. FIG. 3 is a schematic section view taken along line A-A in FIG. 4. As shown in FIGS. 3 and 4, the insulator 232 preferably includes a plurality of upper insulator portions 251 and a plurality of lower insulator portions 252. For example, in FIGS. 3 and 4, the number of the upper insulator portions 251 and the number of the lower insulator portions 252 are nine, respectively. One set of each of the upper insulator portions 251 and each of the lower insulator portions 252 positioned one above the other makes up one insulator portion corresponding to one of the teeth 242. In other words, the insulator 232 preferably includes a plurality of insulator portions corresponding to the teeth 242, respectively. Each of the upper insulator portions 251 preferably covers the upper surface and the upper half area of the side surface of each of the teeth 242. Each of the upper insulator portions 251 preferably includes an outer protrusion 261 and an inner protrusion 262. The outer protrusion 261 which includes a portion protruding axially above the upper end 227 of the outer cylinder portion 222 is preferably positioned radially outwards of each of the coils 233. Furthermore, the outer protrusion 261 is preferably positioned above the outer cylinder portion 222. The inner protrusion 262 protrudes upwards from the upper side of the tip end of each of the teeth 242.

Each of the lower insulator portions 252 is preferably arranged to cover the lower surface and the lower half area of the side surface of each of the teeth 242. Each of the lower insulator portions 252 preferably includes an outer protrusion 263 which is preferably positioned radially outwards of each of the coils 233 to protrude downward. The lower insulator portions 252 preferably includes an inner protrusion 264 which is positioned at the lower side of the tip end of each of the teeth 242 and protrudes downwards. The stator core 231 excluding the outer surface of the core-back 241 and the tip end surfaces, extending in the axial direction, of the teeth 242 is covered with the upper insulator portions 251 and the lower insulator portions 252.

The upper insulator portions 251 preferably include a plurality of different shapes. In the present preferred embodiment, the upper insulator portions 251 preferably include three different shapes, for example. As shown in FIG. 4, for example, some of the upper insulator portions 251 are preferably provided with a pin 265. The pin 265 is preferably a portion protruding upwards from the upper end surface of the outer protrusion 261. Some of the upper insulator portions 251 preferably include a raised portion 266. The raised portion 266 is preferably arranged at the outer surface 270 of the outer protrusion 261. The height of the raised portion 266 is preferably lower than the upper end of the outer surface 270. The outer surface 270 of the outer protrusion 261 is preferably flush with the outer surface of each of the upper insulator portions 251. Some of the upper insulator portions 251 preferably include a through-hole 267. The through-hole 267 preferably extends vertically through the outer protrusion 261 toward the stator core 231. The upper insulator portions 251 which include the pin 265, the raised portion 266 and the through-hole 267 are preferably arranged in plural sets along the circumferential direction. In the present preferred embodiment, three sets of the upper insulator portions 251 each having the pin 265, the raised portion 266 and the through-hole 267 are arranged along the circumferential direction, for example.

The pin 265 is preferably made of, e.g., a resin in the current preferred embodiment. As shown in FIG. 3, the pin 265 is preferably inserted into the through-hole of the circuit board 123 and welded, melted, or otherwise affixed to the circuit board 123. Thus, the circuit board 123 is preferably fixed to the upper end surface of the outer protrusion 261. In FIG. 3, the pin 265, which is not yet welded, is designated by a broken line. Similarly, the pin 265, which is not yet welded, is designated by a broken line in FIG. 9.

After welding, the pin 265 preferably includes an insertion portion 265a and a head portion 265b. The insulation portion 265a is preferably inserted into the through-hole of the circuit board 123. The head portion 265b preferably extends continuously outward from the insertion portion 265a. The head portion 265b is preferably widened around the through-hole at the upper side of the circuit board 123. The head portion 265b is preferably arranged by thermally deforming the upper portion of the pin 265 designated by a broken line.

The circumferential opposite surfaces of the raised portion 266 are preferably positioned radially inwards of the radial outer surface thereof. In other words, the raised portion 266 preferably protrudes radially outwards relative to the recessed portion defined around the raised portion 266. As shown in FIG. 1, the raised portion 266 preferably engages with the ring-shaped coupling portion 151 of the cap member 15. Accordingly, the cap member 15 is fixed to the insulator 232.

As shown in FIG. 3, the circuit board 123 is preferably arranged between the cap member 15 and the upper end surface of the outer protrusion 261. The cap member 15 preferably surrounds the outer circumference of the circuit board 123. This makes it possible to prevent foreign materials from entering inside the cap member 15 through a space between the cap member 15 and the circuit board 123. The side surface of the circuit board 123 is almost covered with the cap member 15. However, the side surface of the circuit board 123 is partially exposed from the cap member 15.

As shown in FIGS. 3 and 4, a coil spring 268 made of, for example, an electrically conductive material is preferably inserted into the through-hole 267. The coil spring 268 presses preferably the core-back 241 and the electrode of the circuit board 123. The cover member 121 which includes electrical conductivity preferably makes direct contact with the stator core 231 which includes electrical conductivity. Accordingly, the cover member 121 is electrically connected to the circuit board 123 through the stator core 231 and the coil spring 268. As a result, the circuit board 123 is arranged to be grounded by grounding the cover member 121.

In the vertical direction, the upper surface of the stator core 231 is preferably flush with the upper end 227 of the outer cylinder portion 222 of the cover member 121. This makes it possible to minimize the height of the outer cylinder portion 222 without reducing the strength at which the stator core 231 is fixed to the outer cylinder portion 222.

The outer surface 270 of each of the upper insulator portions 251 is preferably positioned above the outer cylinder portion 222 and radially outwards of the inner surface 226 of the outer cylinder portion 222. Preferably, the outer surface 270 is not positioned radially outwards of the outer surface of the outer cylinder portion 222. In other words, the outer surface 270 is preferably positioned radially inwards of the outer surface of the outer cylinder portion 222. The outer protrusion 263 of each of the lower insulator portions 252 preferably makes contact with the bottom portion 223 of the cover member 121 in the direction parallel or substantially parallel to the center axis J1. In the following description, the direction parallel or substantially parallel to the center axis J1 will be referred to as "center axis direction". The position of the stator 122 is easily determined by the contact of the outer protrusion 263 with the bottom portion 223. The lower end of the outer surface 270 of each of the upper insulator portions 251 is preferably kept vertically close to the upper end 227 of the outer cylinder portion 222. This helps reduce the irregularity (i.e., roughness on the surface) of the outer surface of the motor 1. The position of the stator 122 may be determined by bringing the lower end of the outer surface 270 into contact with the upper end 227 of the outer cylinder portion 222.

The lower end of the cap member 15 comes into contact with the outer protrusion 261 of each of the upper insulator portions 251. As shown in FIG. 1, the upper insulator portions 251 are preferably radially outwardly exposed at the upper side of the outer cylinder portion 222. In other words, the vertically extending areas of the motor 1 are preferably not completely covered by the cover member 121 and the cap member 15. Since the upper insulator portions 251 cover the outer surface of the stator core 231 just like the cover member 121, it is possible to reduce the height of the outer cylinder portion 222 as compared with the case where the outer surface of the stator core 231 is completely covered with the cover member 121. As shown in FIG. 4, the outer protrusions 261 of the upper insulator portions 251 are preferably arranged along an entire perimeter of the circumferential direction. The opposite end portions 269 are preferably positioned at the circumferential ends of each of the outer protrusions 261. The opposite end portions 269 are preferably provided with end protrusions 272. In a plan view shown in FIG. 4, the end protrusions 272 protrude from the opposite end portions 269 in the circumferential direction. The mutually adjoining end protrusions 272 radially overlap with each other from the axial upper end to the axial lower end thereof. In other words, the opposite end portions 269 of each of the upper insulator portions 251 preferably radially overlap with the opposite end portions 269 of each of the adjoining upper insulator portions 251 at the upper side of the outer cylinder portion 222. This preferably provides a labyrinth structure. As a result, it is possible to prevent dust from entering the inside of the motor 1 in which the insulator 232 is exposed to the outside.

The outer protrusions 261 in the insulator 232 make it possible to reduce the manufacturing cost as compared with the case where the cap member 15 is attached through the use of a separate spacer, or the like. If an attachment portion to devices were provided at the upper side of the motor 1, it would be impossible to get the required attachment strength due to the influence of the resin-made insulator 232. According to the configuration of the motor 1, however, the bottom portion 223 preferably includes the attachment holes 224 arranged such that the shaft 111, which is an output shaft, protrudes downwards at a position radially inward from the attachment holes 224. This makes it possible to get the required attachment strength. Moreover, the circuit board 123 and the encoder 14 are not provided on the bottom portion 223 but arranged at the opposite side from the output shaft. This makes it possible to have the stator 122 positioned near the bottom portion 223. As a result, it is possible to readily position the torque generation center within a bearing span.

The coils 233 are preferably arranged by winding conductive wires in multiple layers over the insulator 232 and around the respective teeth 242. As shown in FIG. 3, the coils 233 are preferably arranged between the outer protrusions 261 and 263 and the inner protrusions 262 and 264 of the upper insulator portions 251 and the lower insulator portions 252. The upper ends 234 of the coils 233 are preferably positioned axially above the upper end 227 of the outer cylinder portion 222. This eliminates the need to upwardly elongate the outer cylinder portion 222 of the cover member 121 even when the stator core 231 has an increased lamination thickness, for example. When an electric current is conducted from the circuit board 123 to the coils 233, torque is generated between the coils 233 and the rotor magnet 113. As a consequence, the rotary unit 11 makes rotation about the center axis J1.

The encoder 14 preferably includes a sensor portion 141 and a plate portion 142. The sensor portion 141 is preferably attached to the upper surface of the circuit board 123. The plate portion 142 is arranged substantially perpendicular or perpendicular to the center axis J1 and attached to the shaft 111. At least one slit is preferably defined in the plate portion 142. The sensor portion 141 optically detects the slit passing therethrough, eventually detecting the rotation speed of the shaft 111.

It is to be noted that a frequency generator pattern may be arranged instead of the encoder 14 on the circuit board 123, and that a frequency generator magnet may be arranged on the connection portion 212 of the rotor holder 112. With this configuration, it is also possible to detect the rotation speed of the shaft 111.

A magnetic sensor 124 is preferably attached to the lower surface of the circuit board 123. The magnetic sensor 124 is preferably supported by the circuit board 123 at the upper side of the rotor magnet 113. The magnetic sensor 124 preferably detects the rotational position of the rotor magnet 113, i.e., the rotation of the rotary unit 11. In the motor 1, a Hall element is preferably used as the magnetic sensor 124. However, a Hall IC incorporating a Hall element therein, for example, may also be used as the magnetic sensor 124 instead.

A frequency generator pattern may be used as the magnetic sensor 124. In this case, the frequency generator pattern is preferably arranged in the circuit board 123 and supported by the circuit board 123 at the upper side of the rotor magnet 113.

As stated above, the stator core 231 is preferably arranged by laminating a plurality of magnetic steel plates one above another. If the magnetic steel plates become thick little by little due to the tolerance thereof, the lamination thickness of the stator core 231 (namely, the center axis direction thickness of the stator core 231) will be increased. When the center axis direction position of the stator is determined by the contact of the stator with the cover member, the upper insulator portions and the circuit board are positioned higher than a desired position by the distance amounting to the increased thickness of the stator core. As a result, the center axis direction distance between the rotor magnet of the rotary unit position-determined with respect to the cover member and the magnetic sensor fixed to the circuit board becomes greater than a desired distance. This reduces the detection accuracy of the rotational position of the rotor magnet.

In the motor 1, the outer protrusions 263 of the lower insulator portions 252 preferably make contact with the bottom portion 223 of the cover member 121 in the center axis direction. This preferably determines the position of the insulator 232 relative to the cover member 121 in the center axis direction, which in turn determines the positions of the stator 122 and the circuit board 123 relative to the cover member 121 in the center axis direction. Consequently, it is possible to reduce the influence of the error (caused by, for example, manufacturing tolerances) in the lamination thickness of the stator core 231, and to determine the position of the magnetic sensor 124 relative to the rotor magnet 113 with increased accuracy. As a result, it is possible to have the magnetic sensor 124 positioned near the rotor magnet 113 and to detect the rotational position of the rotor magnet 113 with increased accuracy. If the detection accuracy of the rotational position of the rotor magnet 113 is kept sufficiently high, it is possible to employ a magnetic sensor of low price and low performance, thereby saving costs. It is also possible to reduce the center axis direction height of the rotor magnet 113.

Other electronic components (not shown) as well as the magnetic sensor 124 are mounted on the circuit board 123. Due to the mounting of the electronic components, the circuit board 123 may sometimes suffer from deformations such as warping or distortion. In the motor 1, the pin 265 of the outer protrusion 261 of the insulator 232 is preferably inserted into the through-hole of the circuit board 123 and welded to the circuit board 123. This makes it possible to suppress deformation of the circuit board 123. As a result, it is possible to enhance the accuracy of the position of the magnetic sensor 124 relative to the rotor magnet 113.

In the motor 1, the circuit board 123 is preferably arranged between the cap member 15 and the upper end surface of the outer protrusion 261. This further suppresses deformation of the circuit board 123. As a consequence, it is possible to further enhance the accuracy of the position of the magnetic sensor 124 relative to the rotor magnet 113.

The circuit board 123 is preferably fixed to the upper end surface of the outer protrusion 261 of the insulator 232. This makes it possible to easily increase the area of the circuit board 123 as compared with the case where the circuit board 123 is fixed to the inner surface of the outer cylinder portion 222. In general, low-priced electronic components are greater in volume than high-priced electronic components. Since the mounting area of electronic components can be increased in the circuit board 123, it is possible to employ electronic components of low price and large volume. As a result, it is possible to reduce the manufacturing cost of the motor 1.

In addition, a connector (not shown) used in connecting the circuit board 123 to an external power source can be readily arranged outside the motor 1 by merely providing a cutout in the lower end portion of the cap member 15 for the connector to be inserted into.

Figure 5:
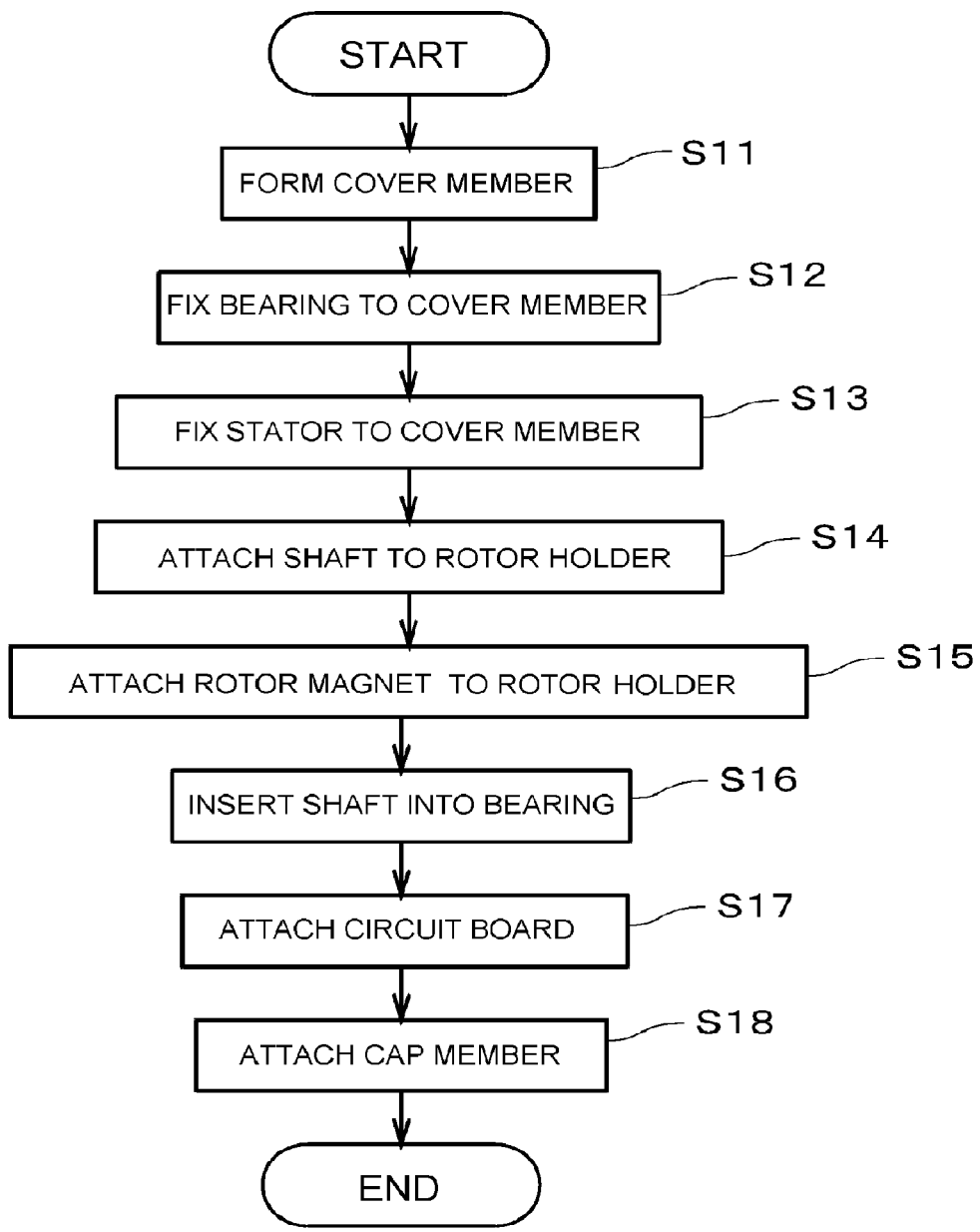
FIG. 5 is a schematic flowchart illustrating a preferred manufacturing flow of a motor according to a preferred embodiment of the present invention.

FIG. 5 is a flowchart illustrating a preferred manufacturing flow of the motor 1. In the manufacture of the motor 1, the cover member 121 preferably is first formed by a press work (step S11). FIGS. 6A through 6D are views illustrating the manufacturing process of the cover member 121.

The cover member 121 may be formed from a single ribbon type metal plate array having plate members partially connected to one another or from a single plate member punched into a circular shape. In other words, the cover member 121 may be formed by one of a progressive die and a transfer type die, for example.

Figure 6A:
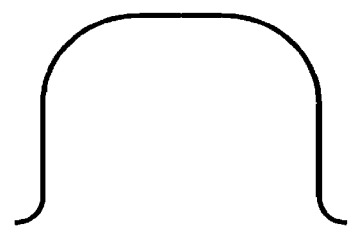
FIG. 6A is a schematic view showing a cover member being manufactured according to a preferred embodiment of the present invention.
Figure 6B:
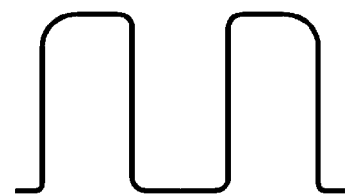
FIG. 6B is another schematic view showing the cover member being manufactured according to a preferred embodiment of the present invention.
Figure 6C:
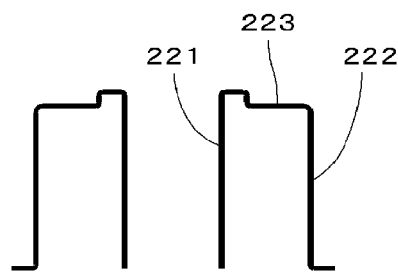
FIG. 6C is a further schematic view showing the cover member being manufactured according to a preferred embodiment of the present invention.
Figure 6D:
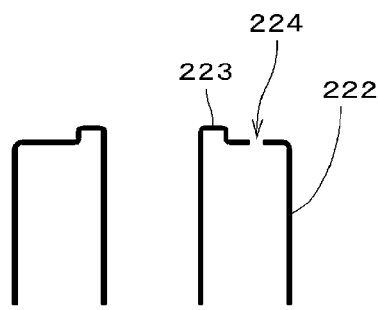
FIG. 6D is a schematic view showing the cover member being manufactured according to a preferred embodiment of the present invention.

As shown in FIG. 6A, a plate member preferably is first formed into a substantially cylindrical closed-top shape by deep drawing performed through a number of press works. Upon subjecting the plate member to deep drawing through an additional number of press works, the plate member preferably includes a shape in which the upper central area protrudes downwards as illustrated in FIG. 6B. Thereafter, a further additional number of press works are preferably conducted to punch the central area as shown in FIG. 6C and to increase the dimensional accuracy of the inner cylinder portion 221, the outer cylinder portion 222 and the bottom portion 223. Finally, as shown in FIG. 6D, the flange of the outer cylinder portion 222 is removed and the attachment holes 224 used for attachment of the motor 1 are formed in the bottom portion 223. The length of the outer cylinder portion 222 is preferably shorter than that of a typical motor having an equivalent size.

This helps reduce the number of press works required when forming the cover member 121. Moreover, this makes it possible to reduce the number of stages in a press machine, which assists in saving the manufacturing cost of dies. As a result, it is possible to reduce the manufacturing cost of the motor 1 and to shorten the manufacturing time thereof. Since the cover member 121 is formed from a single member, it is possible to form the inner cylinder portion 221 and the outer cylinder portion 222 with increased concentricity. This makes it possible to reduce the number of steps required in adjusting the concentricity, which assists in reducing the manufacturing cost of the motor 1.

Next, the bearings 13 are preferably press-fitted and fixed to the inner surface 225 of the inner cylinder portion 221 (step S12). The stator 122 is assembled. The stator 122 is preferably press-fitted and fixed to the inner surface 226 of the outer cylinder portion 222 (step S13).

Next, the rotary unit 11 is assembled. More specifically, the shaft 111 is preferably press-fitted and fixed to the rotor holder 112 (step S14). Then, the rotor magnet 113 is preferably attached to the outer surface of the rotor holder 112 via adhesive (step S15).

The shaft 111 is preferably inserted into the bearings from above in FIG. 2 (step S16). At this time, the resin plates 214 are preferably installed in position. Eventually, the rotor magnet 113 is arranged inside the stator 122. The stopper 215 is preferably attached to the shaft 111. The circuit board 123 is preferably arranged on the insulator 232 from above. Upon welding the pins 265, the circuit board 123 is strongly fixed to the upper end surface of the outer protrusions 261 of the insulator 232 (step S17). The conductive wires of the stator 122 are preferably connected to the circuit board 123. The plate portion 142 of the encoder 14 is preferably attached to the shaft 111. The sensor portion 141 is preferably attached to the circuit board 123.

Finally, the cap member 15 is preferably attached to the outer surface 270 of the outer protrusions 261 of the insulator 232 from above the outer cylinder portion 222 (step S18). At this time, if the cap member 15 is fitted to the insulator 232 from above, the coupling portion 151 will be elastically deformed such that the cap member 15 will go over the raised portions 266 of the insulator 232. The raised portions 266 are fitted to the central holes of the coupling portion 151 while the lower end of the cylinder portion of the cap member 15 comes into contact with the upper portion of the insulator 232. Thus, the upper portion of the stationary unit 12 is sealed. In this manner, the cap member 15 is easily attached to the insulator 232 through a snap-fit using elastic deformation.

Figure 7:
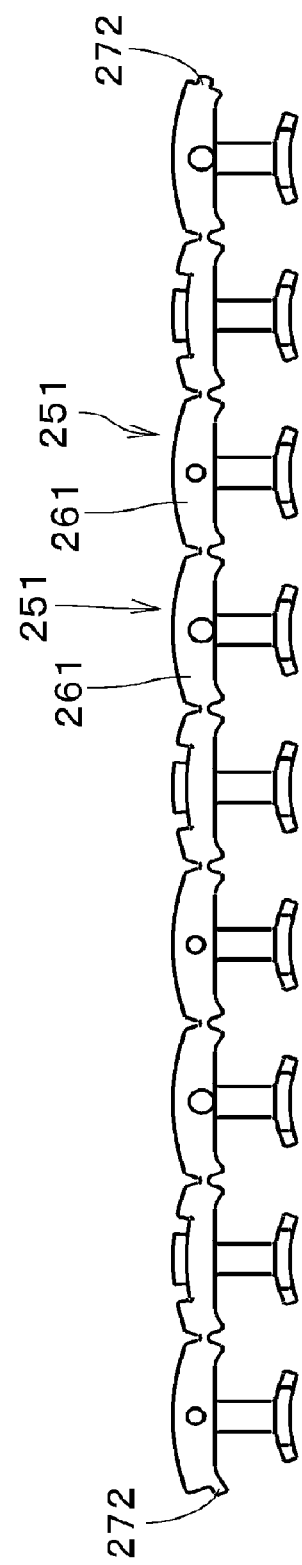
FIG. 7 is a schematic plan view showing another example of the upper insulator portions according to a preferred embodiment of the present invention.

FIG. 7 is a plan view showing another example of the upper insulator portions 251. In FIG. 7, the outer protrusion 261 of each of the upper insulator portions 251 is preferably joined to the outer protrusion 261 of the adjoining upper insulator portion 251. This means that the upper insulator portions 251 preferably extend continuously in the circumferential direction at the upper side of the outer cylinder portion 222 with the exception of a single border. Two upper insulator portions 251 positioned at the opposite ends are preferably provided with end protrusions 272 just like those shown in FIG. 4. In other words, when the insulator 232 is attached to the stator core 231, a non-continuous border exists between two upper insulator portions 251 positioned at the opposite ends. In this border, the end protrusions 272 of the two mutually-adjoining upper insulator portions 251 radially overlap with each other to thereby define a labyrinth structure. This labyrinth structure prevents dust from entering the inside of the motor 1. Just like the upper insulator portions 251, the lower insulator portions 252 may have a continuously extending structure, for example.

Figure 8A:
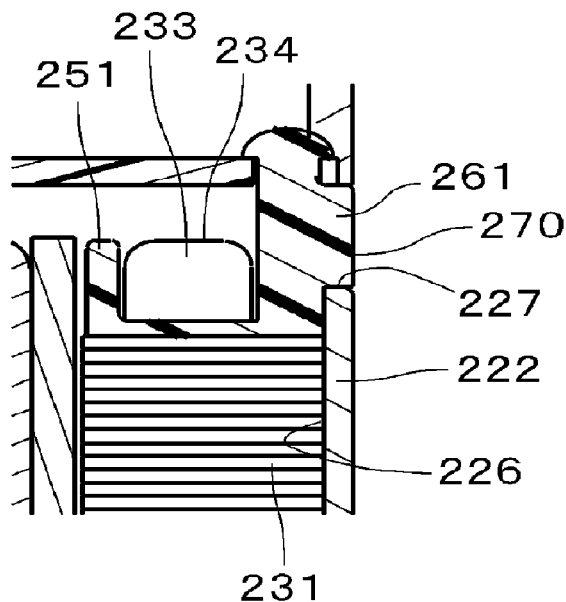
FIG. 8A is schematic a section view showing a further example of the upper insulator portions according to a preferred embodiment of the present invention.

FIG. 8A is a section view showing one of the upper insulator portions 251 in case where the upper surface of the stator core 231 is positioned lower than the upper end 227 of the outer cylinder portion 222. In each of the upper insulator portions 251, the outer surface 270 of the outer protrusion 261 is preferably positioned radially outwards of the inner surface 226 of the outer cylinder portion 222 at the upper side of the outer cylinder portion 222. Thus, the upper insulator portions 251 come vertically close to or make contact with the upper end 227 of the outer cylinder portion 222. The upper ends 234 of the coils 233 are preferably positioned higher than the upper end 227 of the outer cylinder portion 222. The outer protrusions 261 preferably provide electrical insulation between the coils 233 and the outer cylinder portion 222.

Figure 8B:
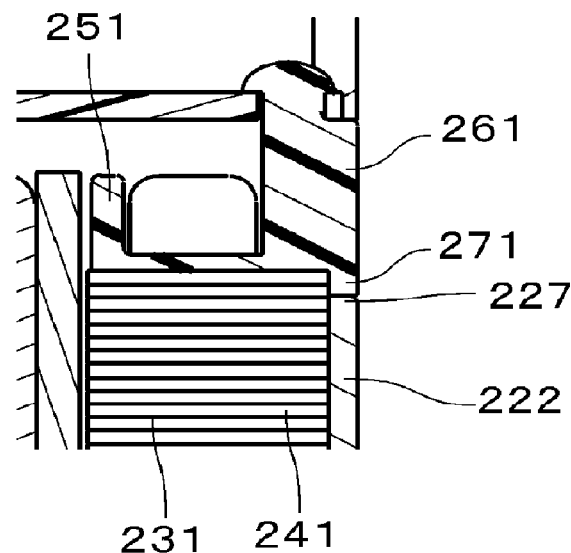
FIG. 8B is a schematic section view showing a still further example of the upper insulator portions according to a preferred embodiment of the present invention.

FIG. 8B is a section view showing one of the upper insulator portions 251 in case where the upper surface of the stator core 231 is positioned higher than the upper end 227 of the outer cylinder portion 222. Each of the upper insulator portions 251 is preferably provided with a portion 271 extending downwards from the outer circumference of the outer protrusion 261. The portion 271 preferably covers the upper area of the outer surface of the core-back 241. Thus, the upper insulator portions 251 vertically come close to or make contact with the upper end 227 of the outer cylinder portion 222.

The cover member 121 is preferably formed through the use of a plurality of dies. Therefore, it is costly to change the design of the cover member 121. In the motor 1, however, the height of the motor 1 can be easily changed by merely altering the shape of the stator core 231 or the insulator 232 as shown in FIGS. 8A and 8B.

Figure 9:
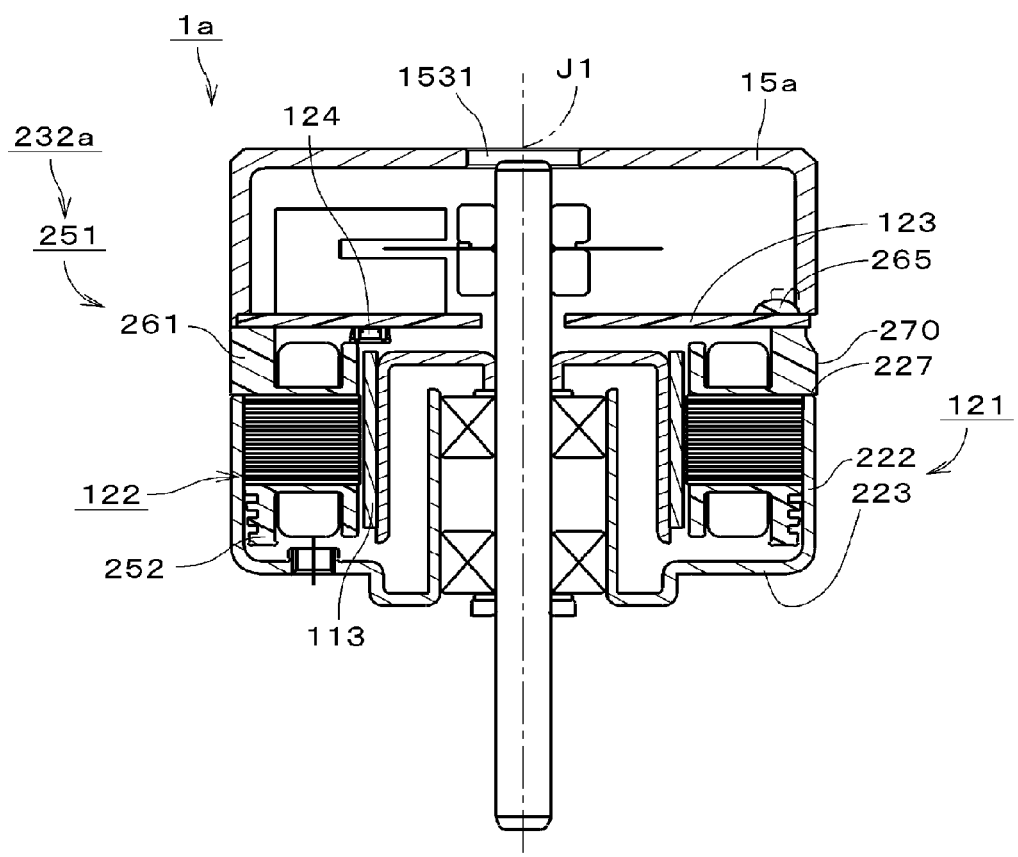
FIG. 9 is a schematic vertical section view showing a motor according to a second preferred embodiment of the present invention.
Figure 10:
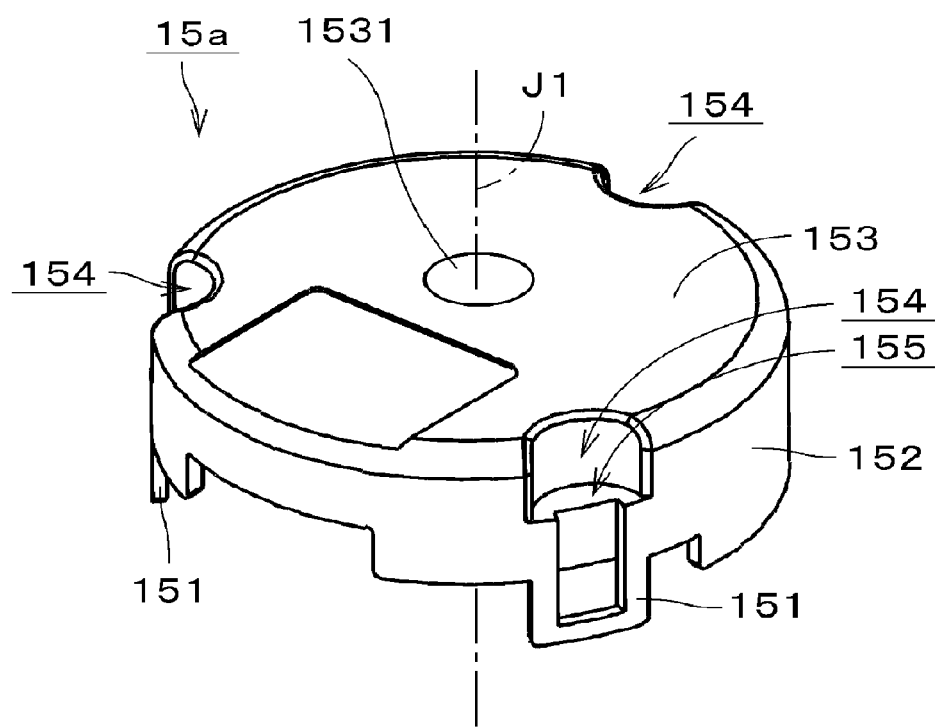
FIG. 10 is a schematic perspective view showing a cap member according to a preferred embodiment of the present invention.
Figure 11:
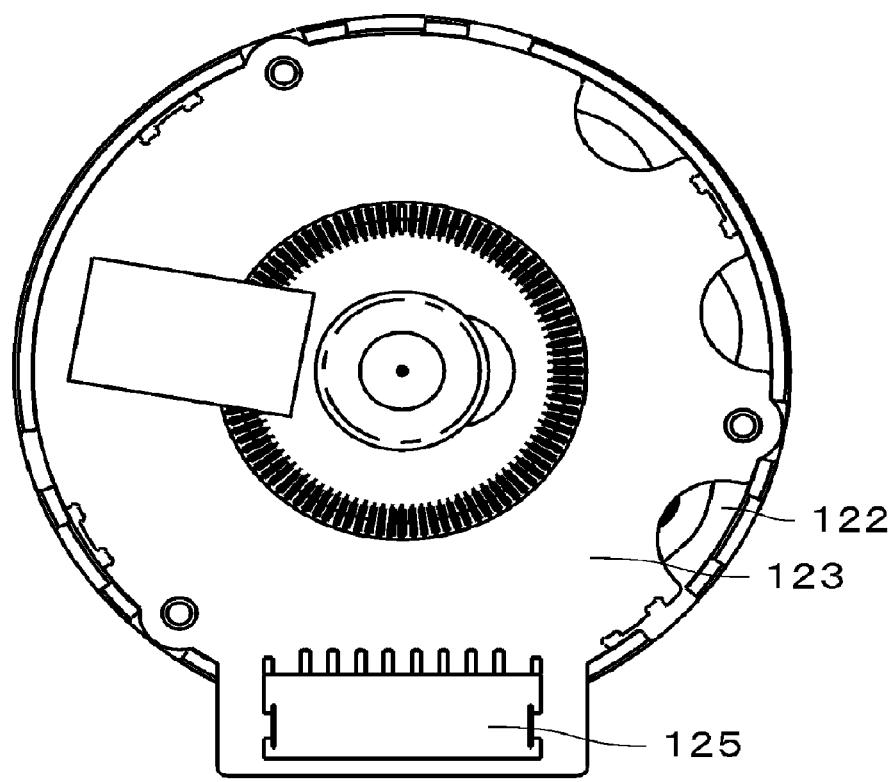
FIG. 11 is a schematic pan view of the motor according to a preferred embodiment of the present invention to which the cap member is not yet attached.
Figure 12:
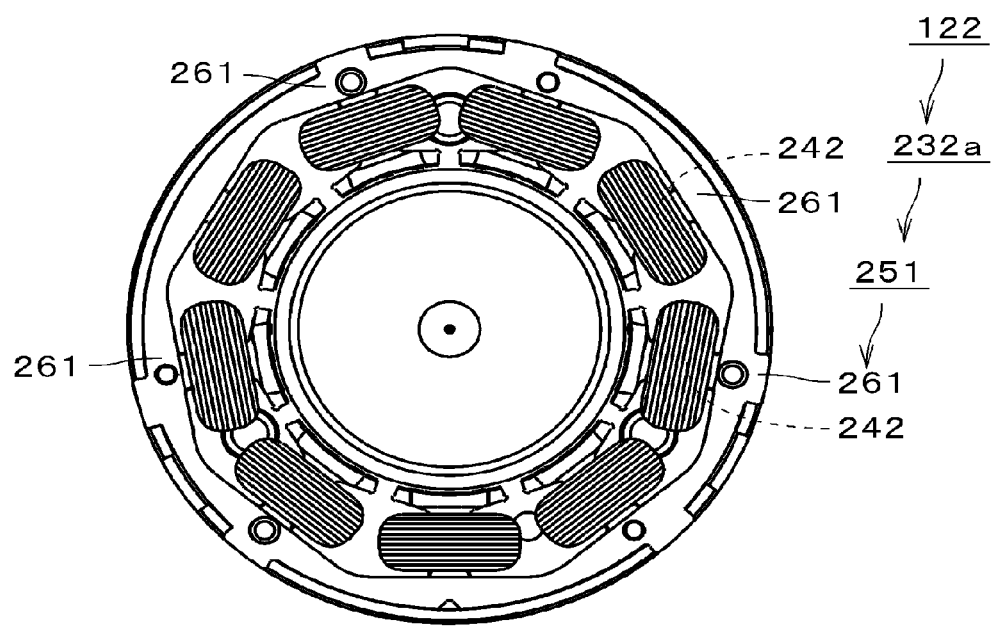
FIG. 12 is a schematic plan view of the motor according to a preferred embodiment of the present invention to which a circuit board is not yet attached.

FIG. 9 is a section view showing a motor 1a according to a second illustrative preferred embodiment. FIG. 10 is a perspective view showing a cap member 15a. FIG. 11 is a plan view of the motor 1a to which the cap member 15a is not yet attached. FIG. 12 is a plan view of the motor 1a to which the circuit board 123 is not yet attached.

The motor 1a preferably includes a cap member 15a whose shape is different from the shape of the cap member 15 shown in FIG. 1. In the motor 1a, the stator 122 is preferably provided with an insulator 232a whose shape is different from the shape of the insulator 232 shown in FIG. 3. Other than the above stated differences the motor 1a is configured substantially the same as the configuration of the motor 1 shown in FIGS. 1 to 3 and, thus, will be designated by like reference numerals with no detailed description made thereon.

As shown in FIG. 12, the insulator 232a is preferably a single member having a substantially annular shape. In the insulator 232a, the portions covering the upper surface and the upper half area of the side surface of the respective teeth 242 are called upper insulator portions 251. The outer protrusion 261 of each of the upper insulator portions 251 is preferably joined to the outer protrusion 261 of the adjoining upper insulator portion 251. As shown in FIG. 9, the lower ends of the outer surfaces 270 of the upper insulator portions 251, i.e., the lower ends of the portions of the outer protrusions 261 adjacent to the outer surfaces 270, preferably make contact with the upper end 227 of the outer cylinder portion 222 of the cover member 121 along the center axis direction. The insulator 232a preferably further includes lower insulator portions 252 spaced apart from and positioned above the bottom portion 223 of the cover member 121.

The position of the insulator 232a relative to the cover member 121 in the center axis direction is determined by the contact of the insulator 232a with the cover member 121. Thus, the positions of the stator 122 and the circuit board 123 relative to the cover member 121 in the center axis direction are determined. As a result, just like the motor 1 described above, it is possible to reduce the influence of the error in the lamination thickness of the stator core 231 and to determine the position of the magnetic sensor 124 relative to the rotor magnet 113 with increased accuracy.

As set forth above, the upper insulator portions 251 are positioned higher than the stator 122. The position of the insulator 232a is preferably determined by the upper insulator portions 251. This makes it possible to reduce the influence of the error in the lamination thickness of the stator core 231 and to determine the position of the circuit board 123 with increased accuracy. Consequently, it is possible to determine the position of the magnetic sensor 124 relative to the rotor magnet 113 with increased accuracy.

The lower insulator portions 252 are preferably arranged in a spaced-apart relationship with the cover member 121. Accordingly, it is possible to prevent the lower insulator portions 252 from being damaged (e.g., crushed and/or deformed) by the cover member 121 when the upper insulator portions 251 are brought into contact with the cover member 121.

In the motor 1a, just like the motor 1 described above, the pins 265 of the outer protrusions 261 of the insulator 232a are preferably inserted into the through-holes of the circuit board 123 and welded, melted, or otherwise affixed to the circuit board 123. This makes it possible to reduce deformation of the circuit board 123. As a result, it is possible to enhance the accuracy of the position of the magnetic sensor 124 relative to the rotor magnet 113.

Moreover, the circuit board 123 is preferably arranged between the cap member 15a and the upper end surfaces of the outer protrusions 261. This further suppresses deformation of the circuit board 123. As a consequence, it is possible to further enhance the accuracy of the position of the magnetic sensor 124 relative to the rotor magnet 113.

The cap member 15a preferably surrounds the outer circumference of the circuit board 123. This makes it possible to prevent dust from infiltrating into the cap member 15a through between the cap member 15a and the circuit board 123. The side surface of the circuit board 123 is almost covered with the cap member 15a. However, the side surface of the circuit board 123 is preferably partially exposed from the cap member 15a.

As shown in FIGS. 9 and 11, the circuit board 123 is fixed to the upper end surface of the outer protrusion 261 of the insulator 232a. This makes it possible to easily increase the area of the circuit board 123 as compared with the case where the circuit board 123 is fixed to the inner surface of the outer cylinder portion 222. In general, low-priced electronic components are greater in volume than high-priced electronic components. Since the mounting area of electronic components can be increased in the circuit board 123, it is possible to employ electronic components of low price and large volume as the electronic components mounted to the circuit board 123. As a result, it is possible to reduce the manufacturing cost of the motor 1*a*. In addition, as shown in FIG. 11, a connector 125 used in connecting the circuit board 123 to an external power source can be readily arranged outside the motor 1*a* by merely defining a cutout in the lower end portion of the cap member 15*a*.

The connector 125 is preferably in-plane mounted to the upper surface of the circuit board 123. More specifically, the electrodes provided on the lower surface of the connector 125 are preferably jointed to the electrodes provided on the upper surface of the circuit board 123. This helps prevent connector pins from protruding below the circuit board 123, thereby making it possible to arrange the circuit board 123 nearer to the stator 122. As a result, it is possible to reduce the distance between the magnetic sensor 124 and the rotor magnet 113 (see FIG. 9) in the center axis direction. It is also possible to reduce the center axis direction height of the motor 1*a*.

Referring to FIG. 10, the cap member 15*a* preferably includes a substantially cylindrical closed-top shape. The cap member 15*a* preferably includes a side wall portion 152, a roof cover portion 153 and a plurality of coupling portions 151. The side wall portion 152 preferably includes a plurality of groove portions 154 extending downwards from the roof cover portion 153. In the present preferred embodiment, the coupling portions 151 and the groove portions 154 are preferably, for example, three in number, respectively. The side wall portion 152 including the groove portions 154 preferably includes a substantially uniform thickness. A groove end surface 155 perpendicular or substantially perpendicular to the center axis J1 is preferably arranged in the lower end portion of each of the groove portions 154. The groove end surface 155 is preferably positioned higher than the circuit board 123. The roof cover portion 153 preferably include a through-hole 1531 defined in an opposing relationship with the shaft 111. When a gear or the like is attached to the lower end portion of the shaft 111 as an output shaft, a jig can be inserted through the through-hole 1531 to hold the shaft 111 stationary such that the shaft 111 will not move during an attachment work process. It is not always necessary to define the through-hole 1531 in the roof cover portion 153. By not defining the through-hole 1531, it is possible to prevent dust from infiltrating into the cap member 15*a*.

The coupling portions 151 preferably protrude downwards from the side wall portion 152 at the lower side of the groove portions 154. At the upper side of the outer cylinder portion 222 of the cover member 121, the coupling portions 151 preferably engage with the raised portions 266 (see FIG. 1) provided on the outer surface 270 of the outer protrusion 261. Thus, the cap member 15*a* is preferably fixed to the insulator 232*a*.

When the cap member 15*a* is fixed to the insulator 232*a*, the groove end surfaces 155 of the groove portions 154 are preferably pressed downwards. No pressure is applied to the roof cover portion 153 of the cap member 15*a*. Therefore, it is possible to prevent deformation of the roof cover portion 153.

Since the coupling portions 151 are provided below the groove portions 154, the forces acting on the groove end surfaces 155 are transferred to the coupling portions 151 with ease. This makes it possible to easily fix the cap member 15*a* to the insulator 232*a*.

In the process of fixing the cap member 15*a*, the areas of the roof cover portion 153 near the groove portions 154 may be pressed downwards. In this case, the strength of the side wall portion 152 is kept high by the groove side surfaces defining the groove portions 154. Therefore, it is possible to prevent deformation of the cap member 15*a*.

In the manufacture of the motor 1*a*, the cover member 121 is preferably formed by the same method as described above in respect of the first preferred embodiment. The length of the outer cylinder portion 222 is shorter than that of a typical motor having an equivalent size. This helps reduce the number of press works required when forming the cover member 121. Moreover, this makes it possible to reduce the number of stages in a press machine, which assists in saving the manufacturing cost of dies. As a result, it is possible to reduce the manufacturing cost of the motor 1*a* and to shorten the manufacturing time thereof.

Since the cover member 121 is formed from a single member, it is possible to form the inner cylinder portion 221 and the outer cylinder portion 222 with increased concentricity. This assists in reducing the manufacturing cost of the motor 1*a*.

The present invention is not limited to the foregoing embodiments as described above but may be modified in many different forms. For example, the bearings 13 may be ball bearings. In this case, the bearings 13 are preferably fixed to the inner cylinder portion 221 with an adhesive.

As the encoder 14, it may be advisable to use an encoder of the type having a cylindrical plate portion 142 whose center coincides with the center axis J1. The encoder 14 may not be attached to the shaft 111. It is also possible to provide the motor such that no encoder is attached to the motor.

The circuit board 123 may be attached to the insulator 232 or 232*a* by a variety of methods other than welding.

In the structures described above, the circuit board 123 need not be always arranged between the cap member 15 or 15*a* and the upper end surface of the outer protrusion 261 of the insulator 232 or 232*a*, if the positional accuracy of the magnetic sensor 124 relative to the rotor magnet 113 is sufficiently ensured by bringing the insulator 232 or 232*a* into contact with the cover member 121 along the axial direction.

Moreover, the insulator 232 or 232*a* need not always make contact with the cover member 121 in the center axis direction, as far as the positional accuracy of the magnetic sensor 124 relative to the rotor magnet 113 can be sufficiently ensured by having the circuit board 123 arranged between the cap member 15 or 15*a* and the upper end surface of the outer protrusion 261 of the insulator 232 or 232*a*.

From the viewpoint of determining the position of the magnetic sensor 124 relative to the rotor magnet 113 with increased accuracy, the inner cylinder portion 221 of the cover member 121 need not always be press-formed together with the bottom portion 223 and the outer cylinder portion 222. For example, the inner cylinder portion 221 may be made of a resin and may be press-fitted to the bottom portion 223.

From the viewpoint of reducing the manufacturing cost of the motor, the position of the insulator 232 or 232*a* need not be always determined by bringing the insulator 232 or 232*a* into contact with the cover member 121 in the axial direction. From the same viewpoint, the circuit board 123 need not be always arranged between the cap member 15 or 15*a* and the upper end surface of the outer protrusion 261 of the insulator 232 or 232*a*.

In the motor 1 or 1a, the circuit board 123 and the cap member 15 or 15a may be omitted.

The order of assembling the motor 1 or 1a may be modified as desired. The shaft 111 and the rotor holder 112 may be formed into a single piece by a cutting work so that they can be kept connected to each other.

The stator core 231 may be divided into a plurality of split cores corresponding to individual ones of or groups of the teeth 242. An annular core 231 may be formed by arranging the adjoining split cores in an end-to-end relationship and bending the arrangement of the split cores.

The stator core 231 may have a shape other than the shape mentioned above. The stator core 231 may be formed by punching magnetic steel plates into a shape having an annular core-back and a plurality of teeth extending inwards from the core-back and then laminating the punched steel plates one above another.

In the motor 1 of the first preferred embodiment, the outer protrusions 261 of the upper insulator portions 251 need not always make contact with each other, as far as the opposite end portions 269 of one of the outer protrusions 261 radially overlaps with the opposite end portions 269 of the adjoining outer protrusions 261. The opposite end portions 269 may have a male-female engagement structures rather than the end protrusions 272.

In FIG. 7, the outer protrusions 261 may be non-continuous at two or more points. The infiltration of dust can be suppressed by continuously arranging at least two upper insulator portions 251 in the circumferential direction at the upper side of the outer cylinder portion 222.

The outer surfaces 270 of the upper insulator portions 251 may not be positioned radially outwards of the inner surface 226 of the outer cylinder portion 222 at the upper side of the outer cylinder portion 222. In other words, the outer surfaces 270 of the upper insulator portions 251 may be positioned radially inwards of the inner surface 226 of the outer cylinder portion 222 at the upper side of the outer cylinder portion 222.

Conductive elastic members other than the coil spring 268 may be used so long as the conductive elastic members can be positioned between the stator core 231 and the circuit board 123 and can be elastically deformed to press the stator core 231 and the circuit board 123 to thereby provide electric connection between the circuit board 123 and the cover member 121. For example, an electrically conductive rubber piece or electrically conductive leaf spring may be used as the conductive elastic members.

Alternatively, an electrically conductive elastic member may be positioned between the cover member 121 and the circuit board 123 so that it can press the cover member 121 and the circuit board 123 to provide electric connection therebetween.

As another alternative example, an electrically conductive member with little elasticity may be used in place of the coil spring 268 as far as it can be electrically connected to the circuit board 123. In other words, the circuit board 123 is directly or indirectly connected to the cover member 121 through the electrically conductive member.

The cap member 15 or 15a may extend to the outer cylinder portion 222 to keep the insulator 232 or 232a unexposed. The coupling portions 151 for realization of snap-fit may have a hook shape with a curved tip end and not the ring shape.

The cover member 121, the insulator 232 or 232a and the cap member 15 or 15a of the motor 1 or 1a can be used in other kinds of motors such as, for example, a stepping motor, a servo motor, or the like. Moreover, the motor 1 or 1a can be utilized in a variety of devices other than office machines.

The configurations of the preferred embodiments and the modified examples described above may be arbitrarily combined unless they are contradictory to one another.

The present invention can be applied to motors having many different applications.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A motor, comprising:
an annular stator arranged to be concentric with a vertically extending center axis;
a bearing;
a cover member arranged to hold the stator and the bearing;
a shaft arranged to be supported by the bearing to rotate about the center axis;
a rotor holder arranged to be connected to the shaft; and
a rotor magnet arranged to be attached to the rotor holder and arranged inside the stator; wherein
the cover member includes an outer cylinder portion arranged to support the stator on the inner surface thereof, an inner cylinder portion coaxial or substantially coaxial with the outer cylinder portion and arranged to support the bearing on the inner surface thereof and a bottom portion arranged to connect the lower end of the outer cylinder portion and the lower end of the inner cylinder portion;
the stator includes a stator core with a plurality of teeth, an insulator arranged to cover the stator core and coils arranged by winding conductive wires over the insulator and around the teeth of the stator core;
the cover member is a single metal plate member;
the insulator includes a protrusion portion arranged radially outwards from the coils to protrude upwards to be higher than the upper end of the outer cylinder portion; and
upper ends of the coils are positioned higher than an upper end of the outer cylinder portion.

2. The motor of claim 1, wherein the insulator is exposed radially outwards at an upper side of the outer cylinder portion such that the insulator extends over an entire circumference of the motor.

3. The motor of claim 2, wherein the stator core is press-fitted to the outer cylinder portion and the upper surface of the stator core being flush with the upper end of the outer cylinder portion in a vertical direction.

4. The motor of claim 2, wherein the insulator includes a plurality of insulator portions corresponding to the teeth, circumferential opposite end portions of each of the insulator portions are radially arranged to overlap with the adjoining insulator portions at the upper side of the outer cylinder portion.

5. The motor of claim 2, wherein the insulator includes a plurality of insulator portions corresponding to the teeth, at least two of the insulator portions extending continuously in a circumferential direction at the upper side of the outer cylinder portion.

6. The motor of claim 5, wherein the insulator portions extend continuously in the circumferential direction at the upper side of the outer cylinder portion with the exception of a single border, the opposite end portions of two adjoining insulator portions in the border radially overlapping with each other.

7. The motor of claim 2, further comprising: a substantially cylindrical closed-top cap member arranged to cover an upper area of the stator, the cap member arranged to be attached to the outer surface of the insulator at the upper side of the outer cylinder portion by a snap-fit.

8. The motor of claim 1, further comprising:
a circuit board positioned above the insulator; and
an electrically conductive member arranged to be electrically connected to the circuit board, the cover member being an electrically conductive member, the circuit board arranged to be directly or indirectly electrically connected to the cover member through the conductive member.

9. The motor of claim 8, wherein the conductive member is a coil spring, the stator core being press-fitted to the outer cylinder portion, the insulator including a through-hole vertically extending to the stator core, the coil spring being inserted into the through-hole.

10. A motor, comprising:
an annular stator arranged to be concentric with a vertically extending center axis;
a bearing;
a cover member arranged to hold the stator and the bearing in position;
a shaft arranged to be supported by the bearing to rotate about the center axis;
a rotor holder arranged to be connected to the shaft;
a rotor magnet attached to the rotor holder and arranged inside the stator;
a magnetic sensor arranged to detect a rotational position of the rotor magnet; and
a circuit board arranged to support the magnetic sensor at the upper side of the rotor magnet; wherein
the cover member includes an outer cylinder portion arranged to support the stator on the inner surface thereof, an inner cylinder portion coaxial or substantially coaxial with the outer cylinder portion and arranged to support the bearing on the inner surface thereof and a bottom portion arranged to connect the lower end of the outer cylinder portion and the lower end of the inner cylinder portion;
the stator includes a stator core with a plurality of teeth, an insulator arranged to cover the stator core, and coils members defined by winding conductive wires over the insulator and around the teeth of the stator core;
the insulator includes a protrusion portion positioned radially outwards of the coils to protrude upwards higher than the upper end of the outer cylinder portion;
the circuit board is fixed to the insulator; and
the insulator makes contact with the cover member in an axial direction.

11. The motor of claim 10, wherein the upper end of the outer cylinder portion makes contact with the insulator in the axial direction.

12. The motor of claim 10, wherein the circuit board is fixed to an upper end surface of the protrusion portion.

13. The motor of claim 12, wherein the protrusion portion includes a pin provided on the upper end surface thereof to hold the circuit board in position, the circuit board including a through-hole, the pin including an insertion portion arranged to be inserted into the through-hole of the circuit board and a head portion continuously extending from the insertion portion and widened around the through-hole at the upper side of the circuit board.

14. The motor of claim 13, wherein the pin is made of a resin, the head portion being a thermally deformed portion.

15. The motor of claim 14, further comprising: a substantially cylindrical closed-top cap member arranged to cover the upper area of the stator, the circuit board being gripped between the cap member and the upper end surface of the protrusion portion.

16. The motor of claim 15, wherein the cap member is arranged to surround the outer circumference of the circuit board.

17. The motor of claim 15, wherein the cap member includes:
a side wall portion and a roof cover portion; and
the side wall portion including a plurality of groove portions extending downwards from the roof cover portion, the side wall portion with the groove portions having a substantially uniform thickness, each of the groove portions including a groove end surface perpendicular or substantially perpendicular to the center axis, the groove end surface being positioned higher than the circuit board.

18. The motor of claim 17, wherein the cap member includes a plurality of coupling portions protruding downwards from the side wall portion at the lower side of the groove portions and engaging with the outer surface of the insulator at the upper side of the outer cylinder portion.

19. The motor of claim 10, further comprising: a connector arranged to connect the circuit board to an external power source, the connector being in-plane mounted to an upper surface of the circuit board.

20. A motor, comprising:
an annular stator arranged to be concentric with a vertically extending center axis;
a bearing;
a cover member arranged to hold the stator and the bearing in position;
a shaft arranged to be supported by the bearing to rotate about the center axis;
a rotor holder arranged to be connected to the shaft;
a rotor magnet arranged to be attached to the rotor holder and arranged inside the stator;
a magnetic sensor arranged to detect the rotational position of the rotor magnet;
a circuit board arranged to support the magnetic sensor at the upper side of the rotor magnet; and
a substantially cylindrical closed-top cap member arranged to cover the upper area of the stator; wherein
the cover member includes an outer cylinder portion arranged to support the stator on the inner surface thereof, an inner cylinder portion coaxial or substantially coaxial with the outer cylinder portion and arranged to support the bearing on the inner surface thereof and a bottom portion arranged to interconnect the lower end of the outer cylinder portion and the lower end of the inner cylinder portion;
the stator including a stator core with a plurality of teeth, an insulator arranged to cover the stator core and coils defined by winding conductive wires over the insulator and around the teeth of the stator core;
the insulator includes a protrusion portion positioned radially outwards of the coils to protrude upwards higher than an upper end of the outer cylinder portion; and
the circuit board is arranged between the cap member and an upper end surface of the protrusion portion.

21. The motor of claim 20, wherein the cap member surrounds an outer circumference of the circuit board.

22. The motor of claim 20, wherein the cap member includes a side wall portion, a roof cover portion and a plurality of groove portions extending downwards from the roof cover portion;
- the side wall portion and the groove portions are have a substantially uniform thickness;
- each of the groove portions includes a groove end surface perpendicular or substantially perpendicular to the center axis; and
- the groove end surface is positioned higher than the circuit board.

23. The motor of claim 22, wherein the cap member includes a plurality of coupling portions protruding downwards from the side wall portion at the lower side of the groove portions and engaging with the outer surface of the insulator at the upper side of the outer cylinder portion.

* * * * *